(No Model.)
F. J. KOST.
CAR WHEEL.
No. 459,976. Patented Sept. 22, 1891.
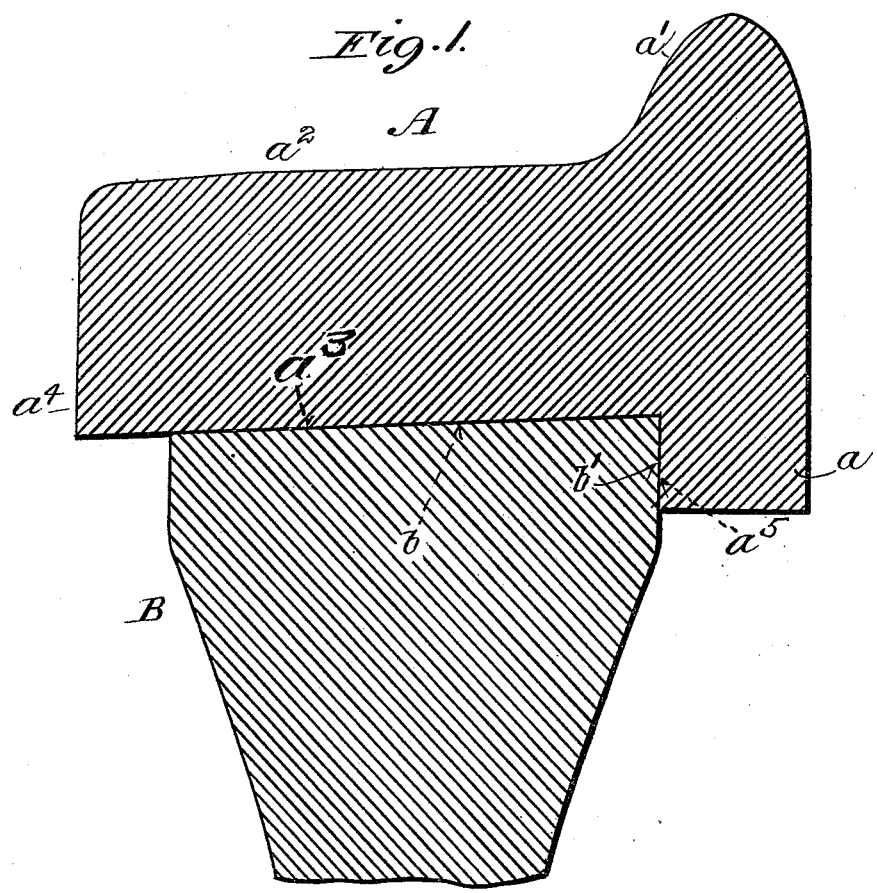
WITNESSES
A. Bonville
Edward C. Furrell
INVENTOR
Frank J. Kost
by C. D. Moody
his atty

UNITED STATES PATENT OFFICE.

FRANK J. KOST, OF ST. LOUIS, MISSOURI.

CAR-WHEEL.

SPECIFICATION forming part of Letters Patent No. 459,976, dated September 22, 1891.

Application filed March 14, 1891. Serial No. 385,130. (No model.)

*To all whom it may concern:*

Be it known that I, FRANK J. KOST, of St. Louis, Missouri, have made a new and useful Improvement in Wheels, of which the following is a full, clear, and exact description.

The improvement is adapted more especially, but not exclusively, to car-wheels, and it relates to that class of wheels in which the rim and the web or spokes of the wheel are made separately and then united in the wheel; and the improvement consists, mainly, in the special mode of constructing and uniting the rim and web, substantially as is hereinafter described and claimed, aided by the annexed drawings, making part of this specification, in which—

Figure 1 is a sectional view of that portion of the wheel with which the improvement is more immediately connected and being a section on the line 1 1 of Fig. 2, which in turn is an outside elevation of the parts shown in Fig. 1. The views are upon different scales.

The same letters of reference denote the same parts.

A represents the wheel-rim, and B represents the web or that portion of the wheel which connects the rim with the hub or central portion of the wheel. These parts, as well as that portion of the wheel which is not exhibited, can be constructed in the usual form, saving as it may be modified or supplemented by the embodiment therein of the improvement under consideration, which, more particularly stated, is as follows: The rim at its inner side is provided with an inwardly-extended flange $a$. The outer portion, the guide-flange $a'$, and the face $a^2$ are in the customary form. The inner face $a^3$, however, is made in the form of a continuous bevel, commencing at or near the outer side $a^4$ of the rim and extending thence to meet the flange $a$—that is, said inner face $a^3$ is inclined to the axis of the wheel, the inner portion of said inner face being farther from the center of the wheel than the outer portion thereof, substantially as shown. The web B at its outer face $b$ is shaped to fit the rim—that is, the face $b$ is beveled to fit the face $a^3$ of the rim—and the inner peripheral portion $b'$ of the web is fitted to the outer face $a^5$ of the rim. By this means a very strong and, if desired, comparatively light wheel can be readily and economically obtained. The flange $a$ serves to strengthen the tire as well as to confine the web at the inner side thereof. The tire is shrunk onto the web, and when the parts are united as shown, the inclination of the inner face of the tire and the face of the web serves to hold the web in place in the tire in the opposite direction.

I claim—

The combination of the rim and the web, said rim having the inwardly-projecting flange $a$ at the inner side of the rim, and having the inner face $a^3$ extending from at or near the outer side of the rim to meet said flange $a$ and inclining farther and farther from the center of the wheel until it meets said flange, and said web having its face beveled and shaped to fit said rim-face and flange, substantially as described.

Witness my hand this 11th day of March, 1891.

FRANK J. KOST.

Witnesses:
C. D. MOODY,
A. BONVILLE.